(12) United States Patent
da Silveira Kuhn et al.

(10) Patent No.: US 11,341,405 B2
(45) Date of Patent: May 24, 2022

(54) SEMANTIC SIGNATURES

(71) Applicant: eBay Inc., San Jose, CA (US)

(72) Inventors: Amanda da Silveira Kuhn, Dublin, CA (US); Era Johal, San Jose, CA (US); Yingwei Xin, San Jose, CA (US); Shuo Li, San Francisco, CA (US); Kunal Nitin Mehta, San Jose, CA (US); Siyu Liao, Brooklyn, NY (US)

(73) Assignee: eBay Inc., San Jose, CA (US)

( * ) Notice: Subject to any disclaimer, the term of this patent is extended or adjusted under 35 U.S.C. 154(b) by 852 days.

(21) Appl. No.: 16/109,280

(22) Filed: Aug. 22, 2018

(65) Prior Publication Data
US 2019/0080234 A1 Mar. 14, 2019

Related U.S. Application Data

(60) Provisional application No. 62/558,180, filed on Sep. 13, 2017.

(51) Int. Cl.
*G06N 3/08* (2006.01)
*G06F 16/28* (2019.01)
*G06N 3/04* (2006.01)
*G06F 40/30* (2020.01)

(52) U.S. Cl.
CPC .......... *G06N 3/08* (2013.01); *G06F 16/285* (2019.01); *G06F 40/30* (2020.01); *G06N 3/0427* (2013.01)

(58) Field of Classification Search
CPC ...... G06N 3/08; G06N 3/0427; G06F 16/285; G06F 40/30
See application file for complete search history.

(56) References Cited

U.S. PATENT DOCUMENTS

| 6,282,362 B1 | 8/2001 | Murphy et al. |
| 6,925,205 B2 | 8/2005 | Leedham et al. |
| 7,515,744 B2 | 4/2009 | Okutsu et al. |

(Continued)

FOREIGN PATENT DOCUMENTS

WO  2019/055278 A1  3/2019

OTHER PUBLICATIONS

Huang et al., "Automotive diagnosis typo correction using domain knowledge and machine learning", Apr. 16-19, 2013, 2013 IEEE Symposium on Computational Intelligence and Data Mining (CIDM), pp. 267-274. (Year: 2013).*

(Continued)

*Primary Examiner* — Kamran Afshar
*Assistant Examiner* — Ying Yu Chen
(74) *Attorney, Agent, or Firm* — Shook, Hardy & Bacon L.L.P.

(57) ABSTRACT

In various embodiments, methods and systems for implementing a semantic signature system are provided. A semantic signature system provides a machine trained semantic representation (i.e., a semantic signature) of the context of a word, synonyms of the word, and weak and strong relationship of the word with other words. The semantic signature can be utilized to facilitate labeling a word that is ambiguous or previously unknown. In practice, the label can be used to more accurately categorize the word for later retrieval by a search or to more accurately provide search results for a search query that includes the word.

16 Claims, 9 Drawing Sheets

(56) References Cited

U.S. PATENT DOCUMENTS

| | | | |
|---|---|---|---|
| 7,996,398 B2* | 8/2011 | Ortega | G06F 16/90 707/728 |
| 9,442,973 B1 | 9/2016 | Tuan et al. | |
| 9,727,983 B2 | 8/2017 | Dorner et al. | |
| 10,380,210 B1* | 8/2019 | Lai | G06F 16/9535 |
| 2007/0036371 A1 | 2/2007 | Buil et al. | |
| 2010/0181340 A1 | 7/2010 | Wallace et al. | |
| 2013/0138654 A1 | 5/2013 | Sathish et al. | |
| 2013/0249934 A1 | 9/2013 | Gershon et al. | |
| 2015/0039994 A1 | 2/2015 | Hoguet | |
| 2017/0235721 A1* | 8/2017 | Almosallam | G06N 3/084 704/9 |
| 2018/0089315 A1* | 3/2018 | Seiber | G06F 16/68 |

OTHER PUBLICATIONS

Liang et al., "Factorization Meets the Item Embedding: Regularizing Matrix Factorization with Item Co-occurrence", Sep. 7, 2016, RecSys '16: Proceedings of the 10th ACM Conference on Recommender Systems Sep. 2016, pp. 59-66. (Year: 2016).*

Collobert et al., "A Unified Architecture for Natural Language Processing: Deep Neural Networks With Multitask Learning", Proceeding ICML '08 Proceedings of the 25th international conference on Machine learning, Jul. 5-9, 2008, pp. 160-167.

Katakis et al., "On the Combination of Textual and Semantic Descriptions for Automated Semantic Web Service Classification", IFIP Advances in Information and Communication Technology, vol. 296, Jan. 1, 2009, pp. 95-104.

Mohler et al., "Semantic Signatures for Example-Based Linguistic Metaphor Detection", Retrieved from the Internet URL: <http://citeseerx.ist.psu.edu/viewdoc/summary?doi=10.1.1.380.4383>, Jun. 13, 2013, pp. 27-35.

International Search Report Received for PCT Application No. PCT/US2018/049706 dated Nov. 9, 2018, 6 pages.

International Written Opinion Received For PCT Application No. PCT/US2018/049706 dated Nov. 9, 2018, 9 pages.

Pilehvar et al., "From Senses to Texts: An All-in-one Graph-based Approach for Measuring Semantic Similarity", Artificial Intelligence, vol. 228, Nov. 2015, pp. 95-128.

Sandler, "On the Use of Linear Programming for Unsupervised Text Classification", Proceeding KDD '05 Proceedings of the eleventh ACM SIGKDD international conference on Knowledge discovery in data mining, Aug. 21-24, 2005, pp. 256-264.

International Preliminary Report on Patentability received for PCT Application No. PCT/US2018/049706, dated Mar. 26, 2020, 8 pages.

* cited by examiner

Overlap: 23.91%

Champagne Gold

Golden Bear

SEMANTIC SIGNATURES

CROSS-REFERENCE

This application claims priority to U.S. Provisional Patent Application No. 62/558,180, filed on Sep. 13, 2017, which is hereby incorporated by reference in its entirety.

BACKGROUND

Users often search online using different types of web pages and applications. Web pages can include, for instance, blogs and social media websites, and applications can include, for instance, messaging applications and multimedia mobile applications. In many instances, on these web pages and applications, users can also make contributions (e.g., posts, comments, listings, and the like).

String matching is currently utilized to retrieve search results or categorize user contributions. However, word ambiguity and queries containing multiple words causes users searching for a particular item to be inundated with unrelated items. Similarly, web pages and applications attempting to categorize user contributions often categorize a particular item with unrelated items. This results in frustrated users and can be resource and time intensive to search for or categorize unrelated items.

SUMMARY

Embodiments of the present invention provide methods and systems for implementing a semantic signature system. A semantic signature system provides a machine trained semantic representation (i.e., a semantic signature) of the context of a word, synonyms of the word, and weak and strong relationship of the word with other words. The semantic signature can be utilized to facilitate labeling a word that is ambiguous or previously unknown. In practice, the label can be used to more accurately categorize the word for later retrieval by a search or to more accurately provide search results for a search query that includes the word.

To do so, non-finding data provided by a user is initially received. The non-finding data is data that is unknown to a structured data dictionary. The non-finding data is converted into a semantic signature using a trained neural network. The semantic signature is a vector-based semantic representation of a context of the non-finding data, synonyms of the non-finding data, and relationships with dynamic finding data. The semantic signature is utilized to label the non-finding data with a classifier.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter

BRIEF DESCRIPTION OF THE DRAWINGS

The present invention is described in detail below with reference to the attached drawing figures, wherein.

DETAILED DESCRIPTION

As noted in the Background, users often search online using different types of web pages and applications. Webpages can include, for instance, blogs and social media websites, and applications can include, for instance, messaging applications and multimedia mobile applications. For example, in the area of e-commerce, a user may interact with the web page or application to search for a particular product. In many instances, on these web pages and applications, users can also make contributions (e.g., posts, comments, listings, and the like). Continuing the e-commerce example, a user may interact with the webpage or application to list a particular product for sale.

String matching is currently utilized to retrieve search results or categorize user contributions. However, word ambiguity and queries containing multiple words causes users searching for a particular item to be inundated with unrelated items. For example, a user may search for an item such as an "XBOX Live 3 month Gold Membership Card." As a result, the user may be provided a number of nonrelated items in the search results (e.g., items for 3 month olds). Similarly, web pages and applications attempting to categorize user contributions often categorize a particular item with unrelated items. For example, a user may describe an item with words such as "champagne," "golden," or "Summit gold." In this instance, the web pages and applications may categorize the item with other items that use the term in any way such as a color, a brand name, or in another fashion. A user searching for an item using, for example, "golden" as a search term may find items using the term as a color (e.g., a golden colored tent) or as a brand (e.g., a GOLDEN BEAR Sportswear item). Although these items are not related, they may each appear in the search results because of the ambiguity of the term "golden" used in the search query and in the description. This results in frustrated users and can be resource and time intensive to search for or categorize unrelated items.

Embodiments of the present invention provide methods and systems for implementing a semantic signature system. At a high level, a semantic signature system provides a machine trained semantic representation (i.e., a semantic signature) of the context of a word, synonyms of the word, and weak and strong relationship of the word with other words. In embodiments, the semantic signature is a visual representation of the word (e.g., a bitmap). The semantic signature can be utilized to facilitate labeling a word that is ambiguous or previously unknown. In practice, the label can be used to more accurately categorize the word for later retrieval by a search or to more accurately provide search results for a search query that includes the word.

Initially, non-finding data provided by a user is received by the webpage or application. The non-finding data is data that is unknown to a structured data dictionary and can be one or more words, metadata, images, or any combination thereof. For clarity, the structured data dictionary includes dynamic finding data, or data that is already known to the webpage or application receiving the non-finding data. In some embodiments, the structured data dictionary may be provided by a third party source that is accessible by the web page or application or the semantic signature system.

A neural network is utilized using data to convert the non-finding data into the semantic signature. The neural network may be trained in multiple ways so a vector-based semantic representation of a context of the non-finding data, synonyms of the non-finding data, and relationships with dynamic finding data can be determined, all of which can be used to describe the non-finding data in the form of a bitmap.

Using the trained neural network, the non-finding data is converted into a semantic signature. The semantic signature can be compared to semantic signatures of dynamic finding data. Upon identifying, semantic signatures similar to the semantic signature, the semantic signature can be utilized to facilitate labeling the non-finding data with a classifier. Advantageously, the classifier enables the semantic signature system to more accurately categorize the non-finding data for later retrieval by a search or to more accurately provide search results for a search query that includes the non-finding data. Embodiments of the present disclosure are further described below with reference to exemplary system components.

Figure 1:
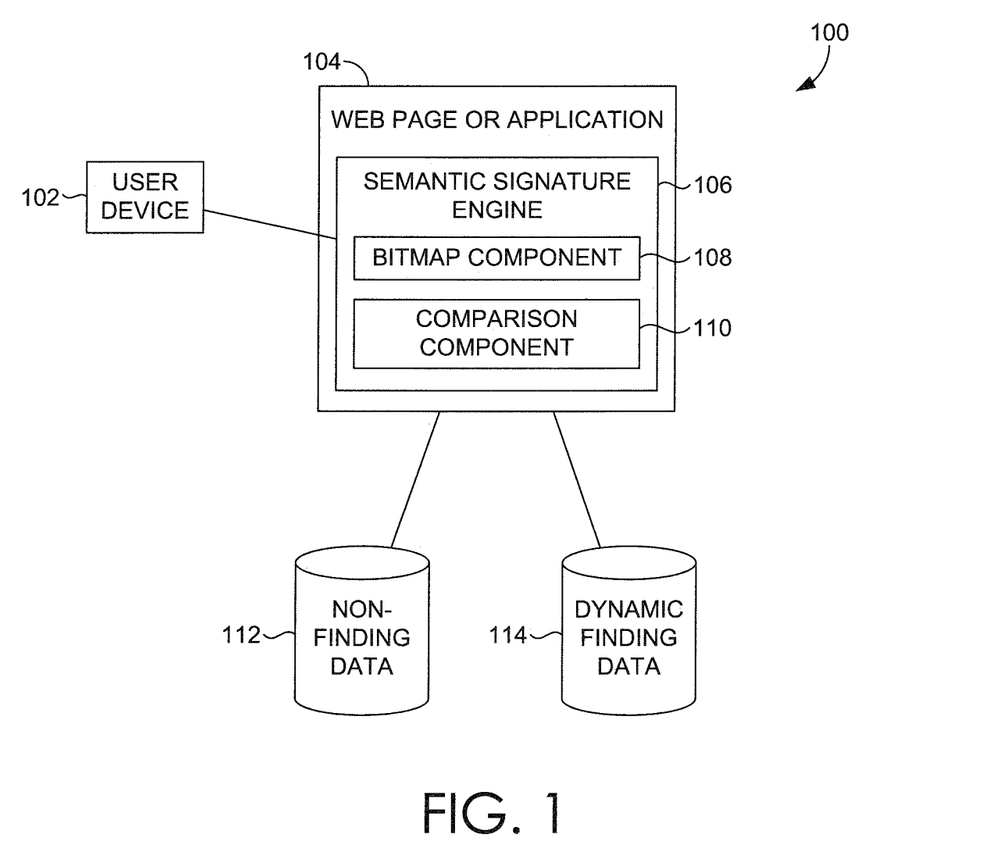
FIG. 1 is a block diagram of an exemplary semantic signature system in which embodiments described herein may be employed.

Referring initially to FIG. 1, an exemplary semantic signature system 100 is illustrated in which implementations of the present disclosure may be employed. In particular, FIG. 1 shows a high level architecture of semantic signature system 100 having components in accordance with implementations of the present disclosure. It should be understood that this and other arrangements described herein are set forth only as examples. In addition, a system, as used herein, refers to any device, process, or service or combination thereof. A system may be implemented using components as hardware, software, firmware, a special-purpose device, or any combination thereof. A system may be integrated into a single device or it may be distributed over multiple devices. The various components of a system may be co-located or distributed. The system may be formed from other systems and components thereof. It should be understood that this and other arrangements described herein are set forth only as examples.

Among other components not shown, semantic signature system 100 includes a user device 102, a web server 104, a semantic signature engine 106, non-finding data store 112, and dynamic finding data store 114. It should be understood that the semantic signature system 100 shown in FIG. 1 is an example of one suitable computing system architecture. Each of the components shown in FIG. 1 may be implemented via any type of computing device, such as computing device 800 described with reference to FIG. 8, for example. The components may communicate with each other via a network, which may include, without limitation, one or more local area networks (LANs) and/or wide area networks (WANs). Such networking environments are commonplace in offices, enterprise-wide computer networks, intranets, and the Internet. It should be understood that any number of user devices, web servers, semantic search engines, and data stores may be employed within the semantic signature system 100 within the scope of the present invention. Each may comprise a single device or multiple devices cooperating in a distributed environment. For instance, the semantic signature engine 106 may be provided via multiple devices arranged in a distributed environment that collectively provide the functionality described herein. In another instance, the semantic signature engine 106 and one or more of the other components that comprise the semantic signature system 100 may be provided via a single device. Additionally, other components not shown may also be included within the network environment.

The components of the semantic signature system 100 can operate together to provide functionality for classifying non-finding data received by web server 104, as described herein. Web server 104 can be an e-commerce application for processing online retail transactions, for instance, buying and selling products. For example, the web server 104 can be the eBay mobile app, developed by eBAY INC., to operate with a corresponding content platform. A content platform (e.g., e-commerce platform) can facilitate consumer-to-consumer and business-to-consumer online sales. A content platform can specifically support search for identifying products in the content platform catalog of products. Search can refer to searching based on keywords, metadata, and the like, to find items having the exact same keywords, metadata, and the like, or substantially similar keywords, metadata, and the like, as provided in a search query.

As shown in FIG. 1, the semantic signature system 100 includes a non-finding data store 112. While only a single non-finding data store 112 is shown in FIG. 1, it should be understood that the semantic signature system 100 may employ any number of non-finding data stores. The non-finding data store 112 may be utilized by the semantic signature engine 106 to convert non-finding data stored in the non-finding data store 112 into semantic signatures.

Also shown in FIG. 1, the semantic signature system 100 includes a dynamic finding data store 114. While only a single dynamic finding data store 114 is shown in FIG. 1, it should be understood that the semantic signature system 100 may employ any number of non-finding data stores. The dynamic finding data store 114 may store dynamic finding data, or data that is known by a structured data dictionary accessible by the web page 104. For example, the dynamic finding data store 114 may store dynamic finding data that has already been labeled for use by the web page 104. The dynamic finding data store 114 may be provided by a third party (e.g., a competitor web page) and comprise data that is labeled in a manner that can be understood and interpreted by the web page 104. The dynamic finding data store 114 may be provided by a trusted source (e.g., an online dictionary or encyclopedia source) that can be mapped to labels that can be understood and interpreted by the web page 104. During training, the dynamic finding data stored by the dynamic finding data store 114 can be converted to semantic signatures. These semantic signatures can be compared to semantic signatures of the non-finding data to determine similarities or substantial similarities that can be utilized to more accurately label the non-finding data.

The semantic search engine 106 is generally configured to receive, from a user via a user device 102, search queries or descriptions of items to be listed on the content platform. In particular, the semantic search engine 106 labels the search query or description with a classifier to provide improved search results or a more accurately classified listing. As shown in FIG. 1, the semantic search engine 106 comprises a bitmap component 108 and a comparison component 110.

Initially, the bitmap component 108 trains a neural network using the dynamic finding data. The neural network can be trained at multiple levels. For example, the neural network can be trained at a taxonomy level (i.e., a taxonomy of a particular e-commerce application), category level, at an item level, a description level, at a brand level, at a title level, or using any available data or metadata. As can be appreciated, the more levels used during training results in a more robust system that can distinguish more effectively between minor differences in the resulting bitmaps. In some embodiments, weights may be applied to different levels to give one level considered by the neural network higher influence over another. The neural network may also be trained using individual words, phrases, metadata corresponding to the individual words or phrase (e.g., fields where the individual words or phrase have been entered) a category, images, and the like.

The neural network can be trained using three different methods. First, a portion of the dynamic finding data is identified (or selected) as an output of the neural network. A remaining portion of the dynamic finding data is utilized as an input of the neural network. The remaining portion of the dynamic finding data that results in the portion of the dynamic finding data being an output of the neural network is identified.

Second, a portion of the dynamic finding data is utilized as an input of the neural network. The portion of the dynamic finding data that results in a remaining portion of the dynamic finding data as an output of the neural network is identified.

Third, co-occurrences of each word in the dynamic finding data with words in a structured data dictionary are identified. A matrix based on the co-occurrences is built and spectral analysis is performed on the matrix. Finally, the results of the neural network (i.e., numerical vectors derived from hidden layers of the neural network) are combined and a semantic signature or visual representation (i.e., a bitmap) of the dynamic finding data is created. For example, the vectors may be rasterized using any known rasterization techniques to create the semantic signature.

Next, the bitmap component 108 utilizes the neural network to convert the non-finding data into semantic signatures. To do so, the neural network is utilized using similar methods described above. First, a portion of the non-finding data is identified (or selected) as an output of the neural network. A remaining portion of the non-finding data is utilized as an input of the neural network. The remaining portion of the non-finding data that results in the portion of the non-finding data being an output of the neural network is identified.

Second, a portion of the non-finding data is utilized as an input of the neural network. The portion of the non-finding data that results in a remaining portion of the non-finding data as an output of the neural network is identified.

Third, co-occurrences of each word in the non-finding data with words in the dynamic finding data are identified. A matrix is built based on the co-occurrences and spectral analysis is performed on the matrix. Finally, the results of the neural network (i.e., numerical vectors derived from hidden layers of the neural network) are combined and a semantic signature or visual representation (i.e., a bitmap) of the non-finding data is created. For example, the vectors may be rasterized using any known rasterization techniques to create the semantic signature.

In practice, and upon receiving a search query from a user via a user device 102, comparison component 110 can compare the semantic signature of the search query to semantic signatures of dynamic finding data, which may also be stored in dynamic finding data store 114. Any known bitmap comparison techniques may be applied by comparison component 110 to identify similar or substantially similar semantic signatures. The dynamic finding data corresponding to the similar or substantially similar semantic signatures may be returned as search results.

In a similar fashion, comparison component 110 may access semantic signatures of non-finding data, which may be stored in non-finding data store 112. As described above, any known comparison techniques may be applied by comparison component 110 to identify similar or substantially similar semantic signatures. Labels corresponding to the dynamic finding data of the similar or substantially similar semantic signatures may be applied to the non-finding data. Accordingly, the items described by the non-finding data may be more accurately categorized for searching by other users.

Figure 2A:
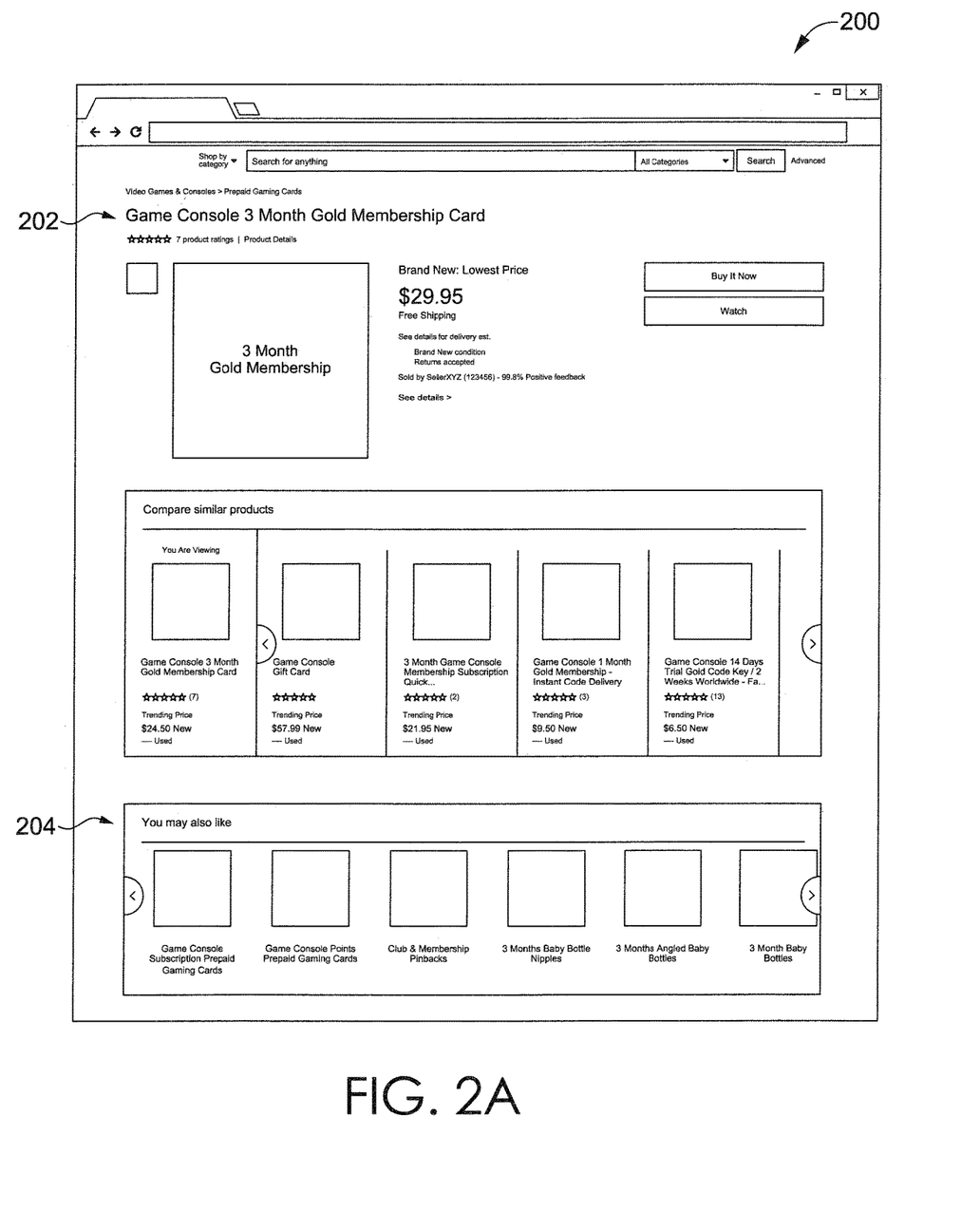
FIGS. 2A and 2B illustrate a comparison of search results pages between a system that utilizes string matches and a system that utilizes semantic signatures, in accordance with embodiments described herein.
Figure 2B:
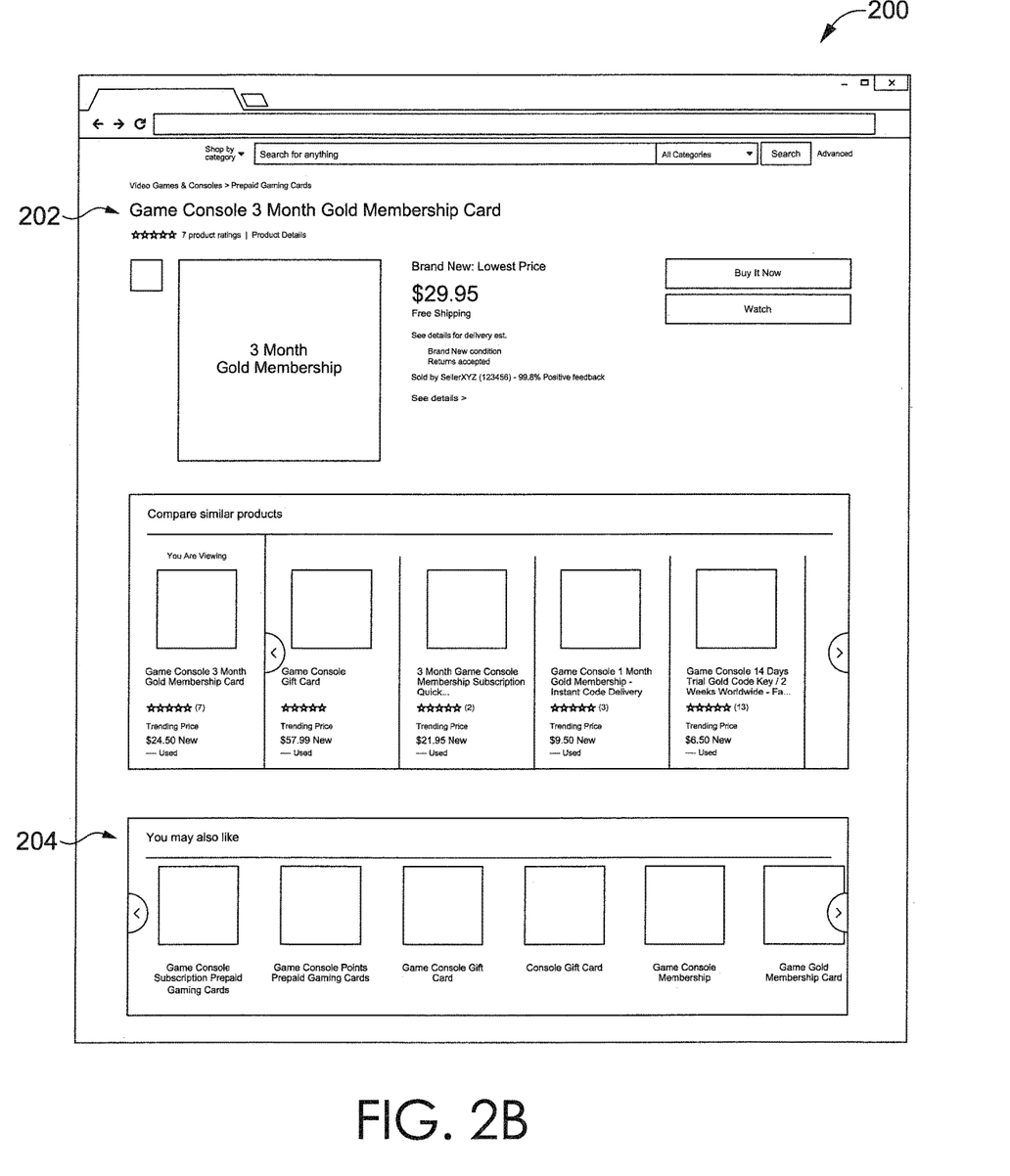

FIGS. 2A and 2B illustrate a comparison of search results pages between a system that utilizes string matches and a system that utilizes semantic signatures, in accordance with embodiments described herein. With initial reference to FIG. 2A, a search is provided for a search query that includes "game console 3 month gold membership card". As illustrated, the search results provides an exact match 202. However, because the search utilizes string matching, suggestions 202 are also provided to completely unrelated items. For example, matches of the terms "3 month" provides suggestions for baby products that are clearly not related to the game console.

In comparison, and referring now to FIG. 2B, the same search is provided for a search query that includes "game console 3 month gold membership card". As illustrated, the search results also provides an exact match 202. However, because the search utilizes semantic signatures, the user is no longer provided suggestions 204 to unrelated items. Instead, each of the suggestions 204 only for items that are clearly related to the game console.

Figure 3:
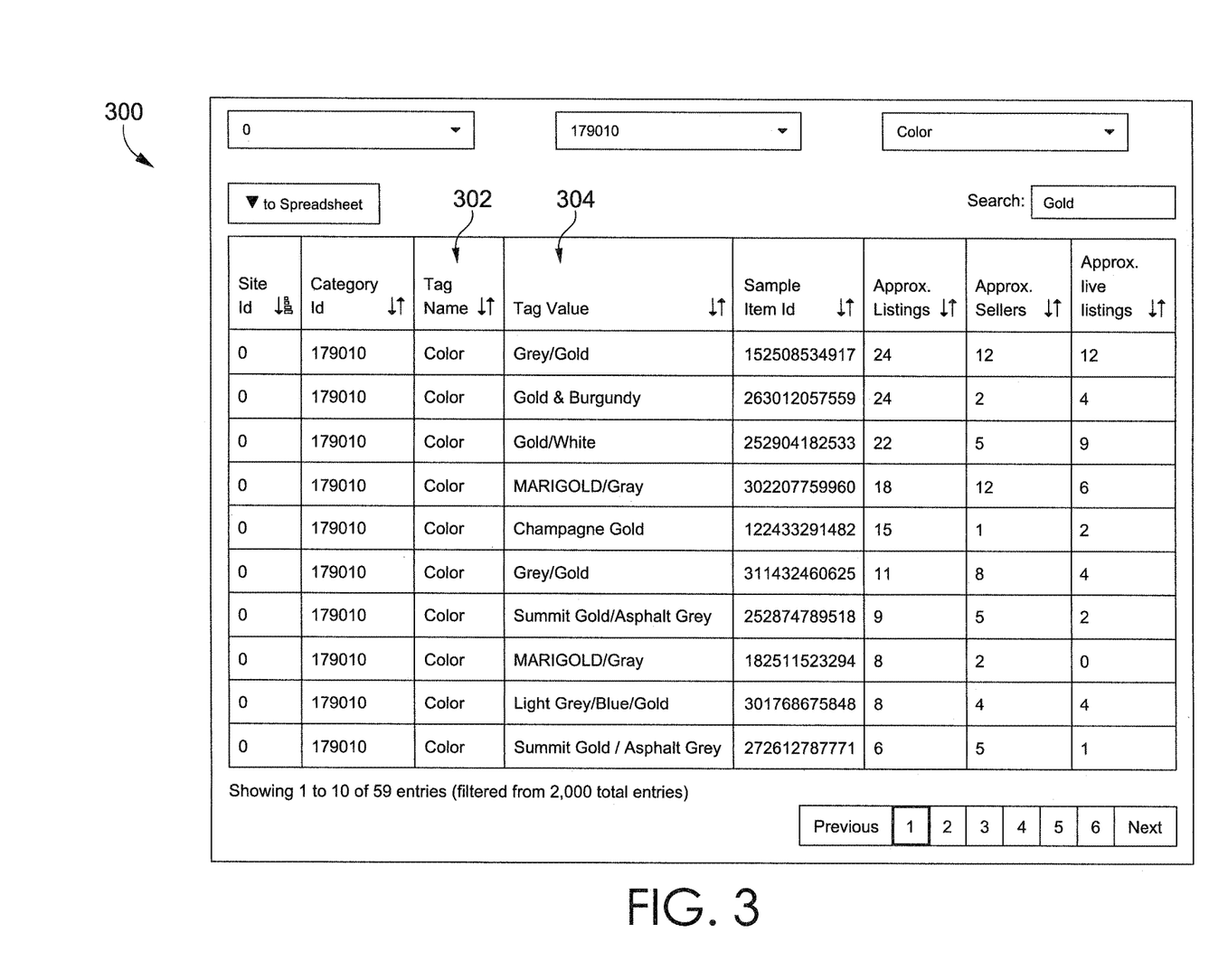
FIG. 3 is an illustration of non-finding data, in accordance with embodiments described herein.

Turning to FIG. 3, an illustration of non-finding data 300 is provided, in accordance with embodiments described herein. As illustrated, the non-finding data may include metadata 302. The metadata 302 may be based on selections made by a user when submitting a description or search query. For example, when listing or searching for an item, the user may select a category for a portion of the description or search query. In the example, as illustrated, the non-finding data categorized as color, which may be utilized as metadata to help disambiguate the non-finding data. In this example, users have submitted descriptions or search queries under the color category having values that are not recognized as known values. For example, combinations of colors or compound words having multiple colors or proprietary colors may not be recognized. Accordingly, the values are maintained as non-finding data 300.

Figure 4:
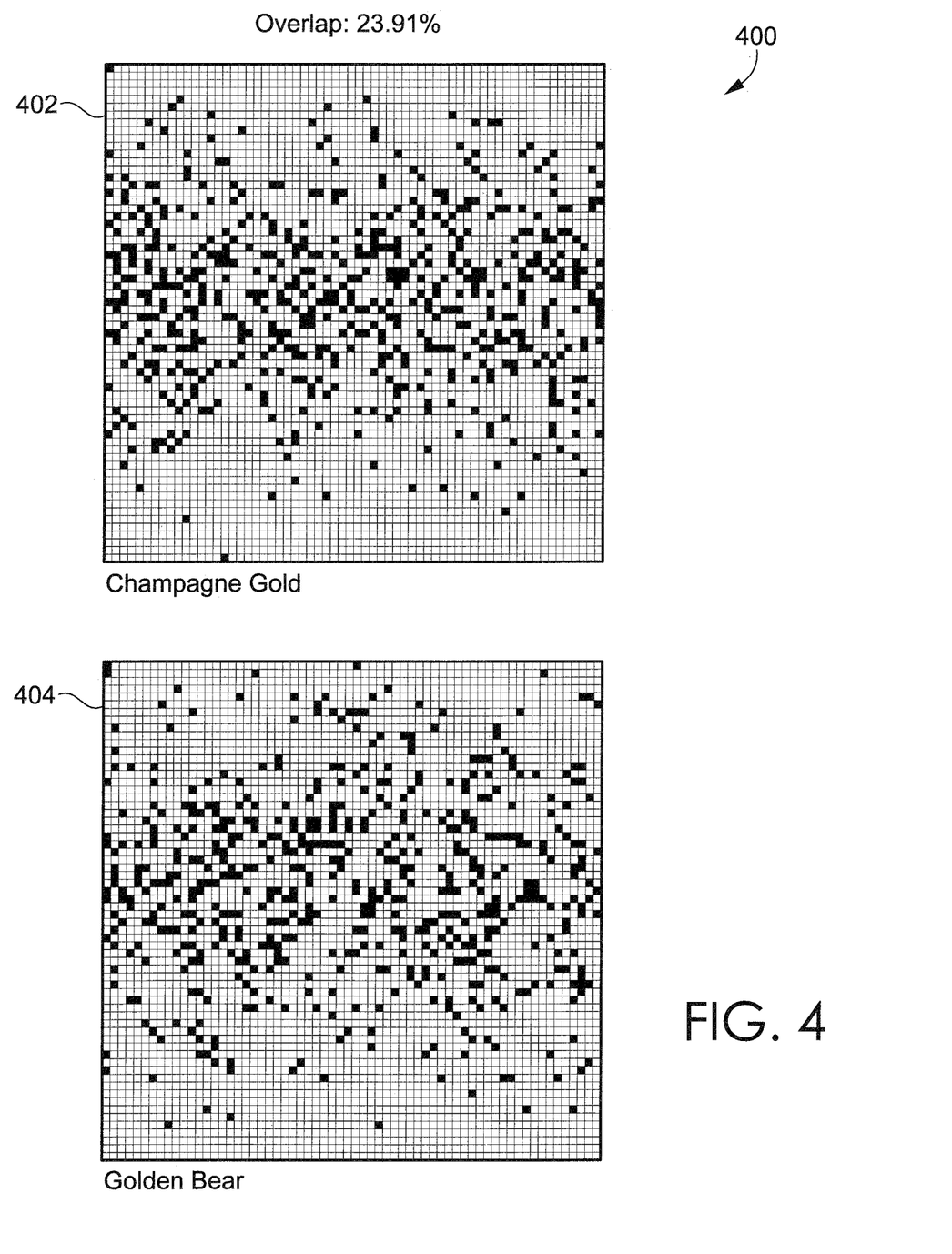
FIG. 4 is an illustration of semantic signatures for two, non-related items, in accordance with embodiments described herein.

Turning to FIG. 4, an illustration of semantic signatures 402, 404 for two, non-related items is provided, in accordance with embodiments described herein. In this example, the two items have non-finding data corresponding to a portion of their description or search query. For example, the first semantic signature 402 is for "Champagne Gold," a color, and the second semantic signature 404 is for "Golden Bear," a brand name. Utilizing typical string matching, a search for one of these terms might result in the other being ranked highly in the search results because of the common term "Gold" found in each search string. However, as illustrated, the semantic signatures 402, 404 only share a 23.91% overlap because the semantic signatures considers a context of the non-finding data, synonyms of the non-finding data, and relationships between the non-finding data and the dynamic finding data, rather than just merely string matching. As a result, a user searching for or listing a product utilizing similarly terms will benefit from far greater accuracy because of the comparison of semantic signatures.

Figure 5:
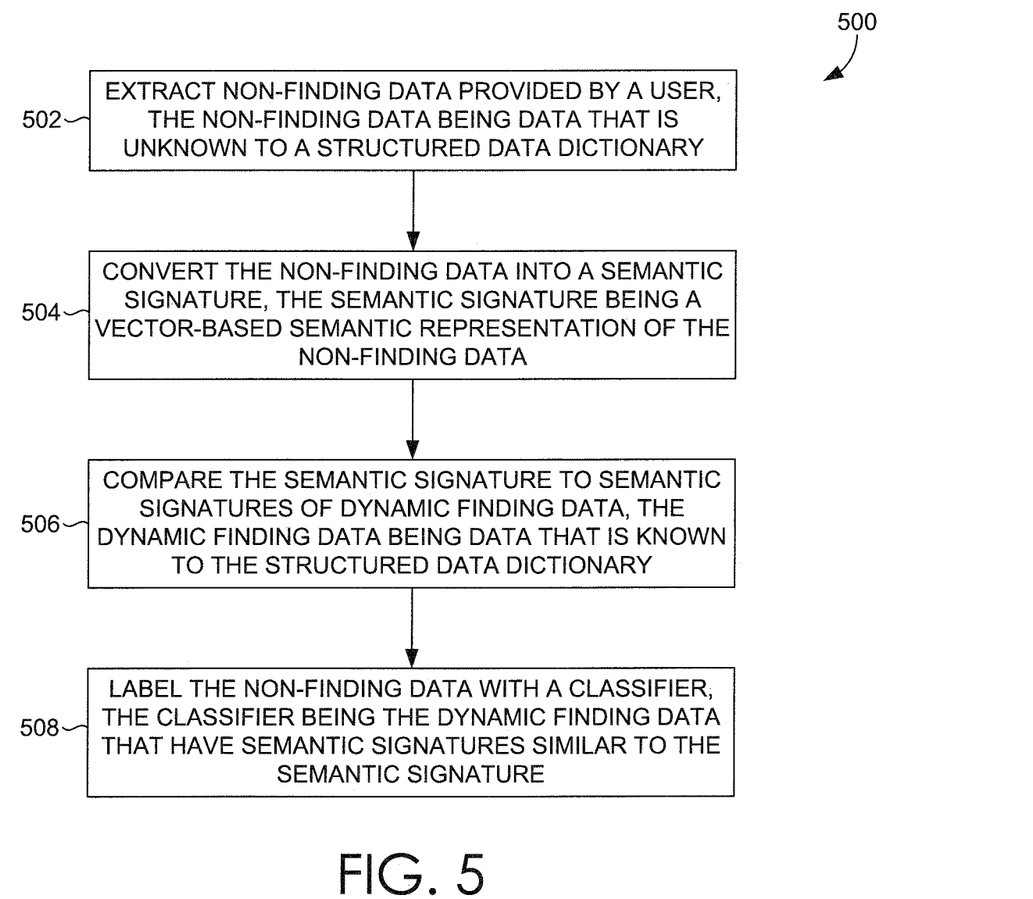
FIG. 5 is a flow diagram showing an exemplary method for implementing a semantic signature system, in accordance with embodiments described herein.
Figure 6:
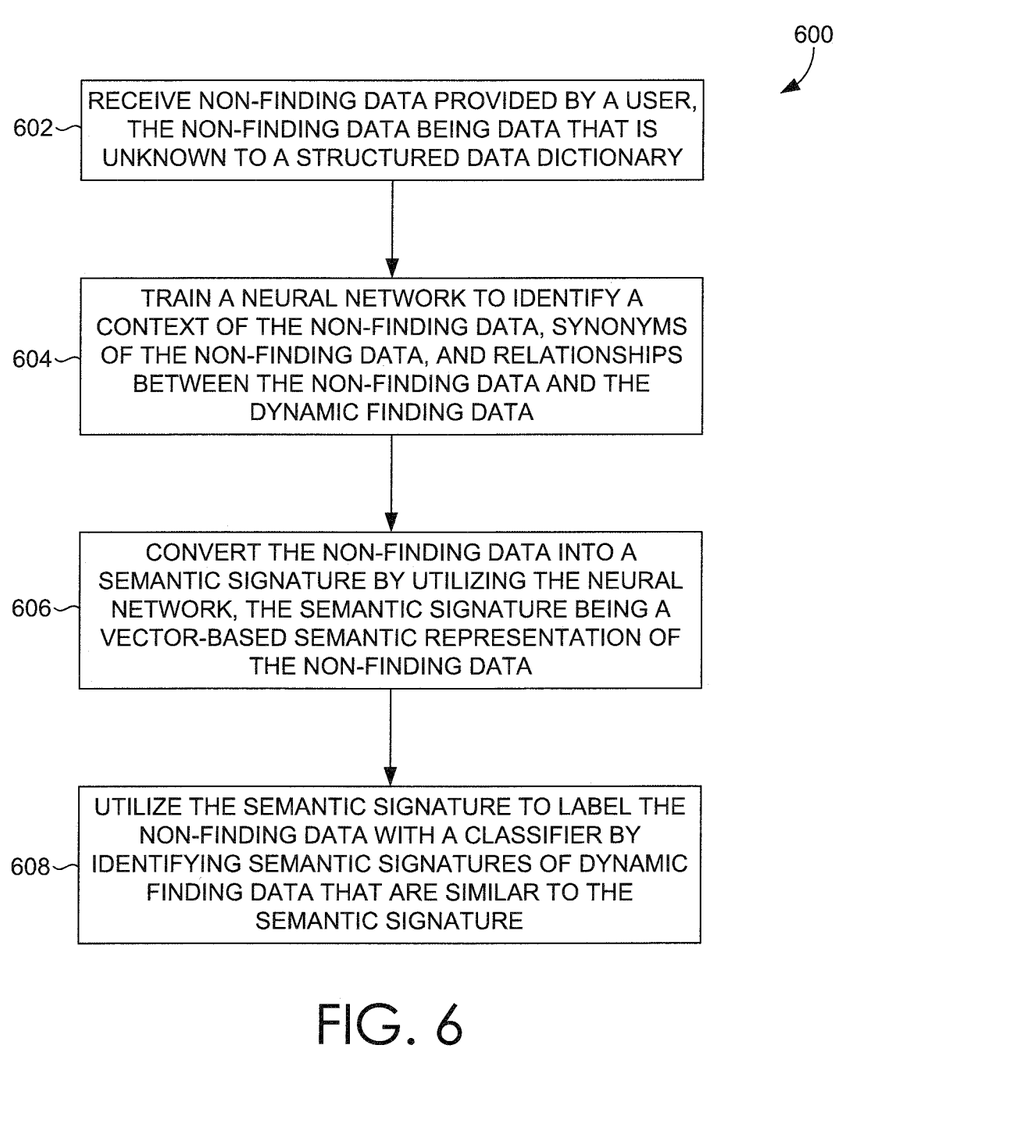
FIG. 6 is a flow diagram showing an exemplary method for implementing a semantic signature system, in accordance with embodiments described herein.
Figure 7:
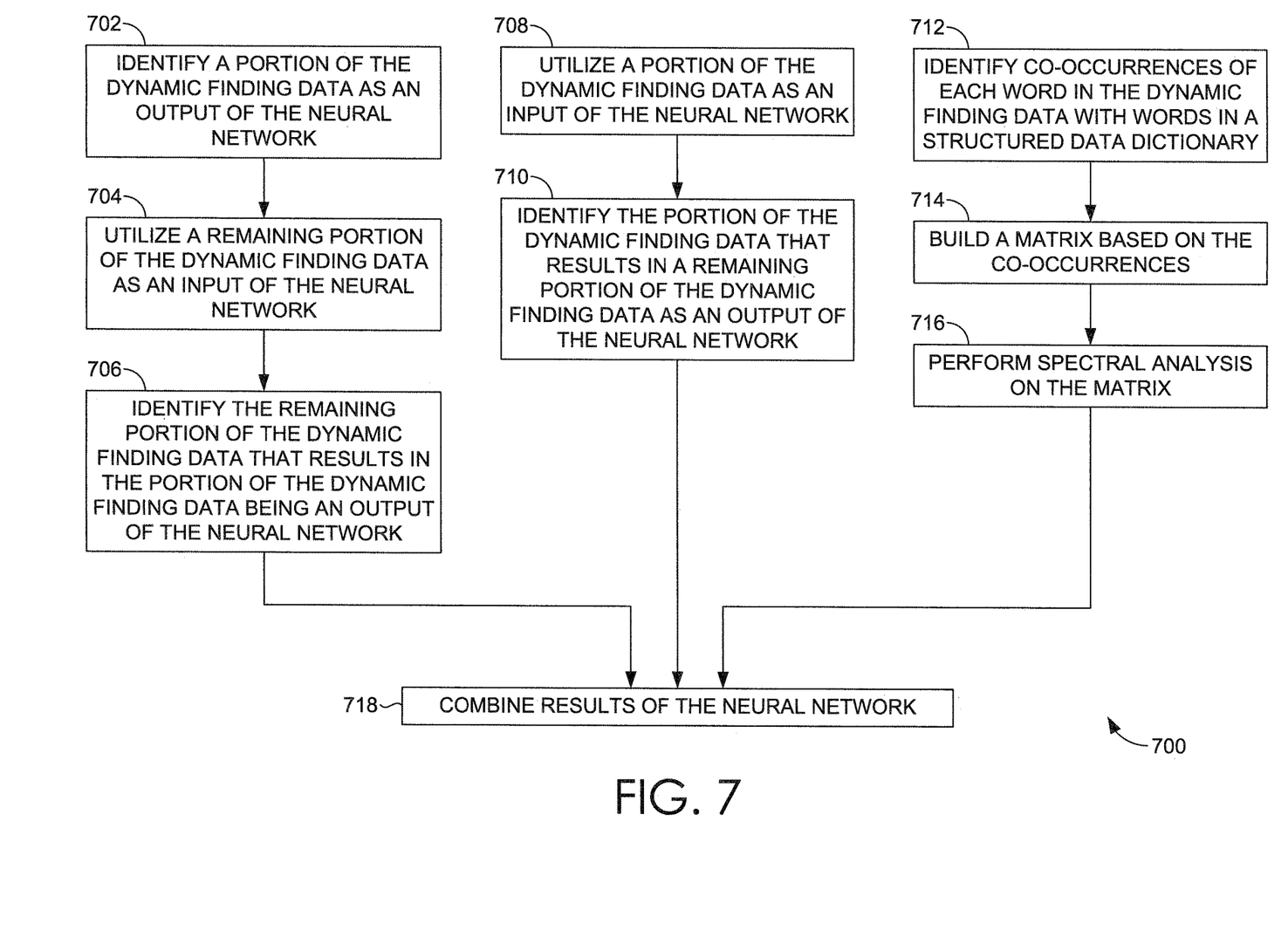
FIG. 7 is a flow diagram showing an exemplary method for utilizing a neural network of a semantic signature system, in accordance with embodiments described herein.

With reference to FIGS. 5, 6, and 7, flow diagrams are provided illustrating methods for implementing a semantic signature system. The methods can be performed using the semantic signature system described herein. In embodiments, one or more computer storage media having computer-executable instructions embodied thereon that, when executed, by one or more processors, can cause the one or more processors to perform the methods in the semantic signature system.

Turning to FIG. 5, a flow diagram is provided that illustrates a method 500 for implementing a semantic signature system. Initially at step 502, non-finding data provided by a user is extracted. The non-finding data may be provided, for example, as part of a search query or as part of a description of an item being listed on a web page or application that other users may search. As described herein, the non-finding data is data that is unknown to a structured data dictionary. The structured data dictionary is data that is known and classified by the web page or application or by a third party that has data accessible to the web page or application.

At step 504, the non-finding data is converted into a semantic signature. To do so, a neural network is utilized to convert the non-finding data into the semantic signature. The semantic signature is a vector-based semantic representation of the non-finding data. The semantic signature includes a context of the non-finding data, synonyms of the non-finding data, and relationships with the dynamic finding data.

The semantic signature is compared, at step 506, to semantic signatures of dynamic finding data. As described herein, the dynamic finding data is data that is known to and classified by the structured data dictionary. To do so, the neural network may be initially trained to convert the dynamic finding data into the semantic signatures.

Based on the comparing, at step 508, the non-finding data is labeled with a classifier. The classifier corresponds to dynamic finding data that has semantic signatures similar to the semantic signature.

Turning to FIG. 6, a flow diagram is provided that illustrates a method 600 for implementing semantic signature system. Initially at step 602, non-finding data provided by a user is received. The non-finding data is data that is unknown to a structured data dictionary.

At step 604, a neural network is trained to identify a context of the non-finding data, synonyms of the non-finding data, and relationships between the non-finding data and the dynamic finding data. The non-finding data is converted, at step 606, into a semantic signature by utilizing the neural network. The semantic signature is a vector-based semantic representation of the non-finding data and can be utilized, at step 608, to label the non-finding data with a classifier by identifying semantic signatures of dynamic finding data that are similar to the semantic signature. In embodiments, the label is utilized to categorize an item described by the non-finding data or provide results to a query comprising the non-finding data In embodiments, the neural network is trained to convert the dynamic finding data into the semantic signatures. The dynamic finding data is data that is known to the structured data dictionary. To do so, the neural network is trained using three methods. First, a portion of the dynamic finding data is identified as an output of the neural network. A remaining portion of the dynamic finding data is utilized as an input of the neural network. The remaining portion of the dynamic finding data that results in the portion of the dynamic finding data being an output of the neural network is identified.

Second, a portion of the dynamic finding data is utilized as an input of the neural network. The portion of the dynamic finding data that results in a remaining portion of the dynamic finding data as an output of the neural network is identified.

Third, co-occurrences of each word in the dynamic finding data with words in a structured data dictionary are identified. A matrix is built based on the co-occurrences and spectral analysis is performed on the matrix. The results of each of the three methods are combined and the dynamic finding data is converted into a semantic signature that can later be used to compare to semantic of non-finding data.

Turning to FIG. 7, a flow diagram is provided that illustrates a method for training a neural network of a semantic signature system. Initially, in a first method, at step 702, a portion of the dynamic finding data is set as an output of the neural network. The remaining portion of the dynamic finding data is utilized, at step 704, as an input of the neural network. At step 706, the remaining portion of the dynamic finding data that results in the portion of the dynamic finding data being an output of the neural network is identified.

In a second method, at step 708, a portion of the dynamic finding data is utilized as an input of the neural network. The portion of the dynamic finding data that results in a remaining portion of the dynamic finding data is identified, at step 710, as an output of the neural network.

In a third method, at step 712, co-occurrences of each word in the dynamic finding data with words in a structured data dictionary are identified. A matrix, based on the co-occurrences, is built, at step 714. Spectral analysis is performed, at step 716, on the matrix.

At step 718, each of the results for the three methods described above is combined to convert the dynamic finding data into the semantic signature.

Having identified various component of the semantic signature system 100, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are exemplary in nature and in number and are not to be construed as limiting for all implementations of the present disclosure. The semantic signature system 100 functionality can be further described based on the functionality and features of the above-listed components.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 8:
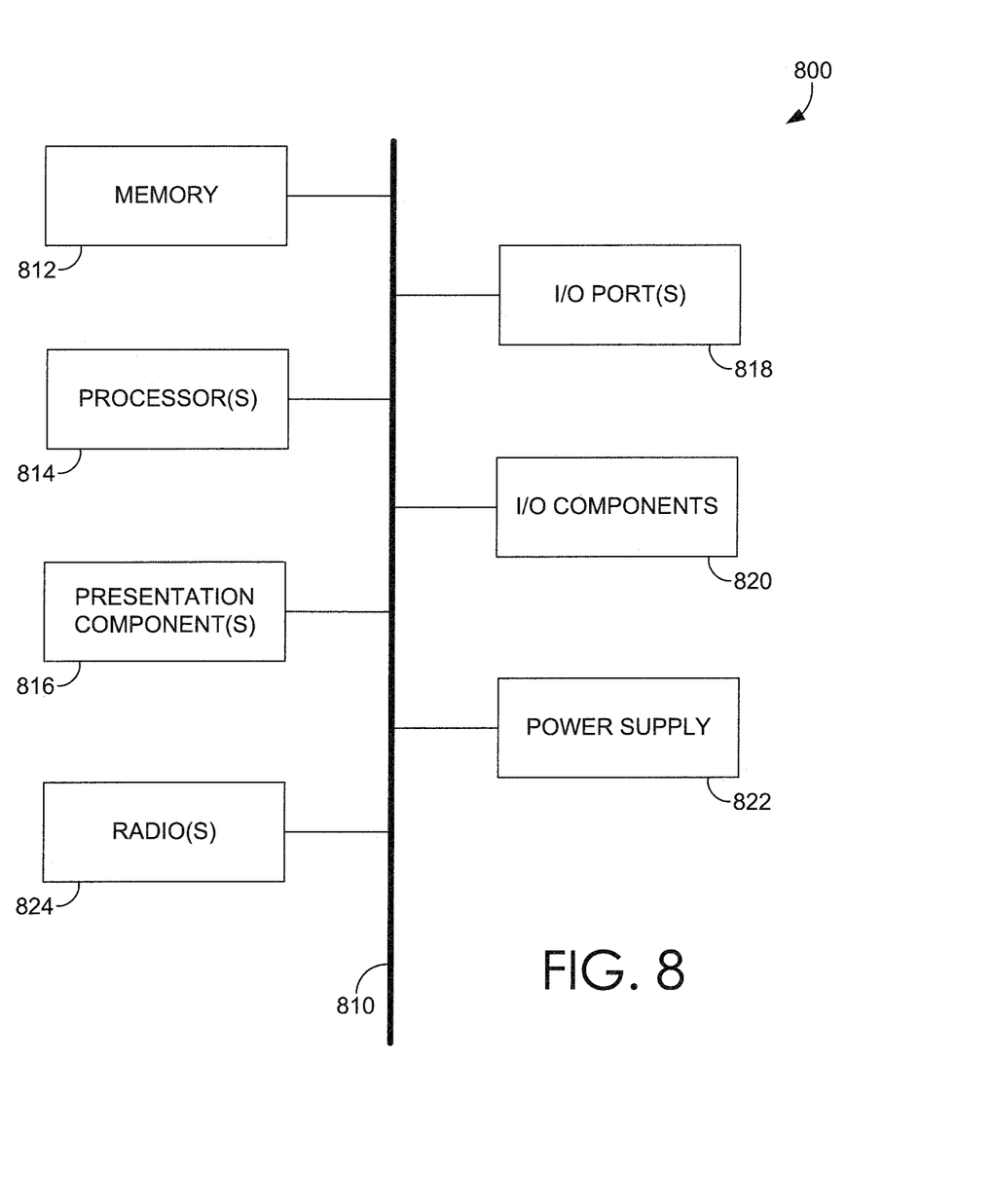
FIG. 8 is a block diagram of an exemplary computing environment suitable for use in implementing embodiments described herein.

Having briefly described an overview of embodiments of the present invention, an exemplary operating environment in which embodiments of the present invention may be implemented is described below in order to provide a general context for various aspects of the present invention. Referring initially to FIG. 8 in particular, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes a bus 810 that directly or indirectly couples the following devices: memory 812, one or more processors 814, one or more presentation components 816, input/output ports 818, input/output components 820, and an illustrative power supply 822. Bus 810 represents what may be one or more busses (such as an address bus, data bus, or combination thereof). Although the various steps of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 8 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein. Also, the word "initiating" has the same broad meaning as the word "executing or "instructing" where the corresponding action can be performed to completion or interrupted based on an occurrence of another action. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the distributed data object management system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A system for utilizing semantic signatures to classify unknown words, the system comprising:
   one or more processors; and
   one or more computer storage media storing computer-useable instructions that, when used by the one or more processors, cause the one or more processors to:
      receive, at a search engine, a search query or item listing description comprising non-finding data, the non-finding data being data that is unknown to a structured data dictionary stored in a data store;
      training a neural network to convert the non-finding data into a semantic signature, the semantic signature being a vector-based semantic representation of a context of the non-finding data, synonyms of the non-finding data, and relationships with dynamic finding data;
      based on a bitmap comparison relative to the semantic signature, identify similar semantic signatures of dynamic finding data, the similar semantic signatures corresponding to a classifier;
      label the search query or item listing description comprising the non-finding data with the classifier; and
      identify search results corresponding to the search query and the classifier or categorize the item listing description based on the classifier.

2. The system of claim 1, wherein training the neural network comprises:
   identifying a portion of the dynamic finding data as an output of the neural network;
   utilizing a remaining portion of the dynamic finding data as an input of the neural network; and
   identifying the remaining portion of the dynamic finding data that results in the portion of the dynamic finding data being an output of the neural network.

3. The system of claim 2, wherein training the neural network comprises:
   utilizing the portion of the dynamic finding data as an input of the neural network;
   identifying the portion of the dynamic finding data that results in a remaining portion of the non-finding data as an output of the neural network.

4. The system of claim 3, wherein training the neural network comprises:
   identifying co-occurrences of each word in the dynamic finding data with words in a structured data dictionary;
   building a matrix based on the co-occurrences; and
   performing spectral analysis on the matrix.

5. The system of claim 4, further comprising combining a plurality of results of training the neural network.

6. One or more computer storage media having computer-executable instructions embodied thereon that, when executed, by one or more processors, cause the one or more processors to perform a method for utilizing semantic signatures to classify unknown words, the method comprising:
   extracting non-finding data received at a search engine and corresponding to a search query or item listing description, the non-finding data being data that is unknown to a structured data dictionary;
   training a neural network to convert the non-finding data into a semantic signature, the semantic signature being a vector-based semantic representation of the non-finding data, wherein the semantic signature includes a context of the non-finding data, synonyms of the non-finding data, and relationships with the dynamic finding data;
   based on a bitmap comparison relative to the semantic signature, identifying similar semantic signatures of dynamic finding data, the similar semantic signatures corresponding to a classifier;
   labeling the search query or item listing description comprising the non-finding data with the classifier; and
   identifying search results corresponding to the search query and the classifier or categorizing the item listing description based on the classifier.

7. The media of claim 6, further comprising utilizing the neural network to convert the dynamic finding data into the semantic signatures.

8. The media of claim 6, wherein training the neural network comprises:
   identifying a portion of the dynamic finding data as an output of the neural network;
   utilizing a remaining portion of the dynamic finding data as an input of the neural network; and
   identifying the remaining portion of the dynamic finding data that results in the portion of the non-finding data being an output of the neural network.

9. The media of claim 8, wherein training the neural network comprises:
   utilizing a portion of the dynamic data as an input of the neural network;
   identifying the portion of the dynamic data that results in a remaining portion of the dynamic data as an output of the neural network.

10. The media of claim 9, wherein training the neural network comprises:
    identifying co-occurrences of each word in the dynamic data with words in a structured data dictionary;
    building a matrix based on the co-occurrences; and
    performing spectral analysis on the matrix.

11. The media of claim 10, further comprising combining a plurality of results of the neural network.

12. A computer-implemented method for utilizing semantic signatures to classify unknown words, the method comprising:
    receiving, at a search engine, a search query or item listing description comprising non-finding data, the non-finding data being data that is unknown to a structured data dictionary;
    training a neural network to convert the non-finding data into a semantic signature, the semantic signature being a vector-based semantic representation of a context of the non-finding data, synonyms of the non-finding data, and relationships between the non-finding data and the dynamic finding data;
    based on a bitmap comparison relative to the semantic signature, identifying similar semantic signatures of dynamic finding data, the similar semantic signatures corresponding to a classifier;
    labeling the search query or item listing description comprising the non-finding data with the classifier; and
    identifying search results corresponding to the search query and the classifier or categorizing the item listing description based on the classifier.

13. The method of claim 12, further comprising training a neural network to convert the dynamic finding data into semantic signatures of dynamic finding data, the dynamic finding data being data that is known to the structured data dictionary.

14. The method of claim 13, wherein training the neural network comprises:
    identifying a portion of the dynamic finding data as an output of the neural network;
    utilizing a remaining portion of the dynamic finding data as an input of the neural network; and
    identifying the remaining portion of the dynamic finding data that results in the portion of the dynamic finding data being an output of the neural network.

15. The method of claim 14, wherein training the neural network comprises:
    utilizing the portion of the dynamic finding data as an input of the neural network; and
    identifying the portion of the dynamic finding data that results in a remaining portion of the dynamic finding data as an output of the neural network.

16. The method of claim 15, wherein training the neural network comprises:
    identifying co-occurrences of each word in the dynamic finding data with words in a structured data dictionary;
    building a matrix based on the co-occurrences;
    performing spectral analysis on the matrix; and
    combining a plurality of results of training the neural network.

* * * * *